United States Patent [19]

Rodgers et al.

[11] Patent Number: 5,083,941

[45] Date of Patent: Jan. 28, 1992

[54] MULTIPLE TELEPHONE JACK SLIDE ASSEMBLY HAVING RESILIENT CLOSED CHANNEL

[76] Inventors: E. Walter Rodgers, 5650 W. Marconi, Glendale, Ariz. 85306; Lenual E. Rodgers, Jr., 1434 W. Pershing, Phoenix, Ariz. 85029

[21] Appl. No.: 584,089

[22] Filed: Sep. 18, 1990

[51] Int. Cl.⁵ ............................................. H01R 13/74
[52] U.S. Cl. ................................... 439/532; 439/553; 439/716; 379/328
[58] Field of Search ............... 439/49, 532, 553, 552, 439/540, 542, 557, 569, 709, 716; 379/325, 328, 329, 399

[56] References Cited

U.S. PATENT DOCUMENTS

| | | | |
|---|---|---|---|
| 3,160,280 | 12/1964 | Burch | 439/716 |
| 3,182,805 | 5/1965 | Foster, Jr. et al. | 211/26 |
| 4,658,418 | 4/1987 | Rodgers | 379/328 |
| 4,712,232 | 12/1987 | Rodgers | 439/532 |
| 4,773,867 | 9/1988 | Keller et al. | 439/49 |
| 4,883,432 | 11/1989 | Reed | 439/553 |
| 4,909,757 | 3/1990 | Reed | 439/532 |

OTHER PUBLICATIONS

Anixter Brothers, Inc., Skokie, Illinois, "Business Communication Products" catalog, outside cover bearing year date 1986, inside pages marked 1985, pp. 4, 7, and 73.
Graybar Clayton, Missouri, product catalog No. 38, bearing 1986 copyright notice, pp. 15-7, 15-8 and 15-20.
"Instruction Sheet for 8 Wire 110-Type Connectors to Modular Jacks", pp. 1 and 2, bearing date 5/23/89, regarding a Jack Panel construction, believed to be distributed by AT&T.

Primary Examiner—Larry I. Schwartz
Assistant Examiner—Kevin J. Carroll
Attorney, Agent, or Firm—Cahill, Sutton & Thomas

[57] ABSTRACT

A multiple telephone jack slide assembly includes a jack support member for supporting a multitude of telephone jacks upon an electronic wire connecting system. The jack support member is molded from resilient flame-retardant plastic and includes a channel formed by a rectangular-shaped, elongated slotted aperture. The telephone jacks include side walls which slidingly engage edge portions of the slotted aperture to support the jacks within the channel. The channel has closed ends, and the length of the channel is substantially an integral multiple N of the length of each jack whereby N jacks can be supported in abutting end-to-end relationship with each other and with the closed ends of the channel. The jack support member is sufficiently resilient to permit the channel to be temporarily pulled apart near its central portion for insertion of the jacks into the channel.

12 Claims, 2 Drawing Sheets

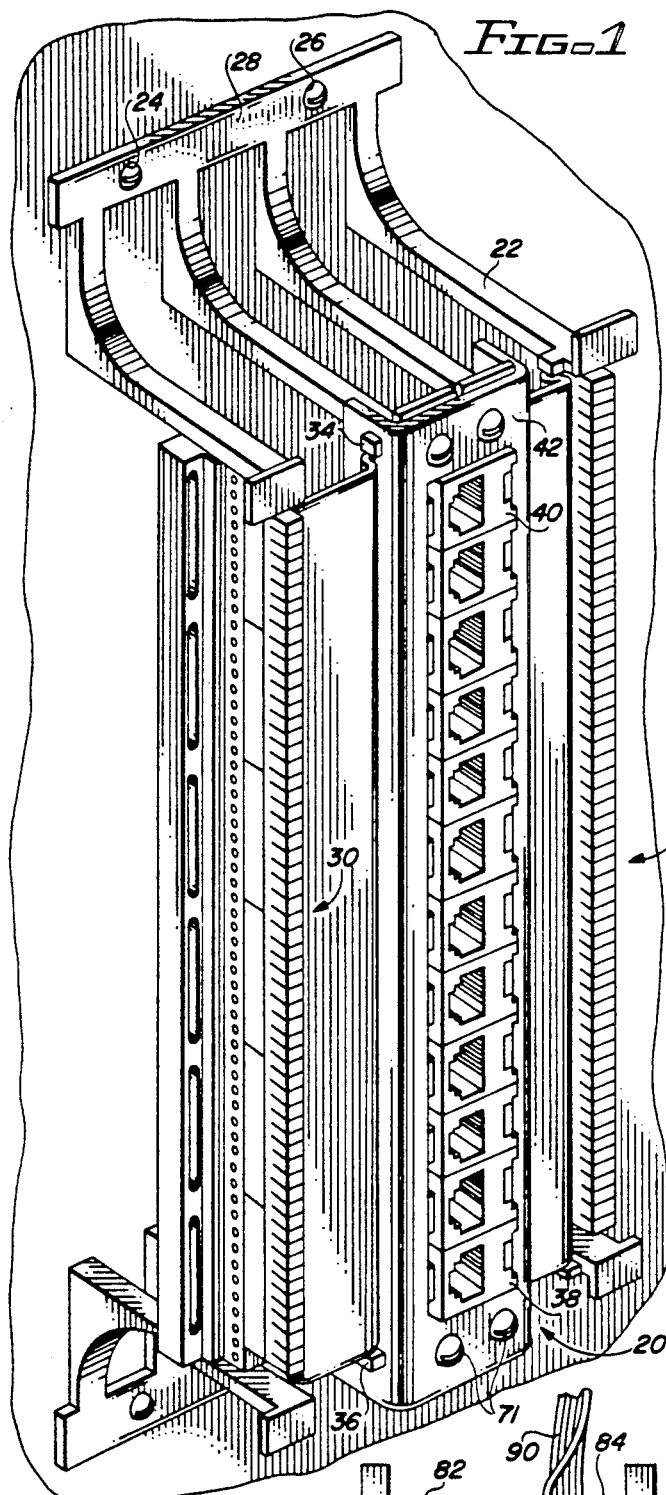
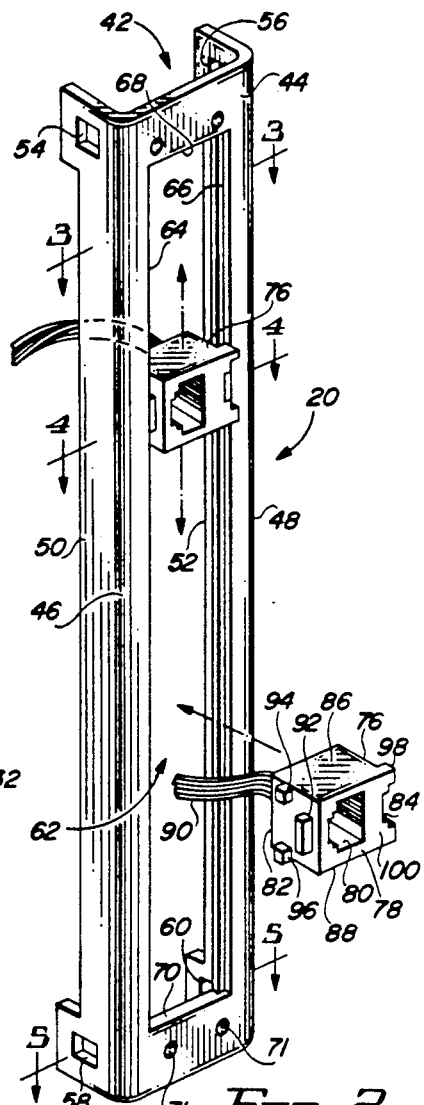
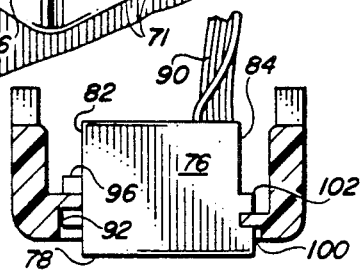
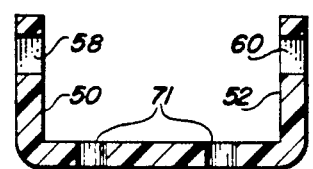

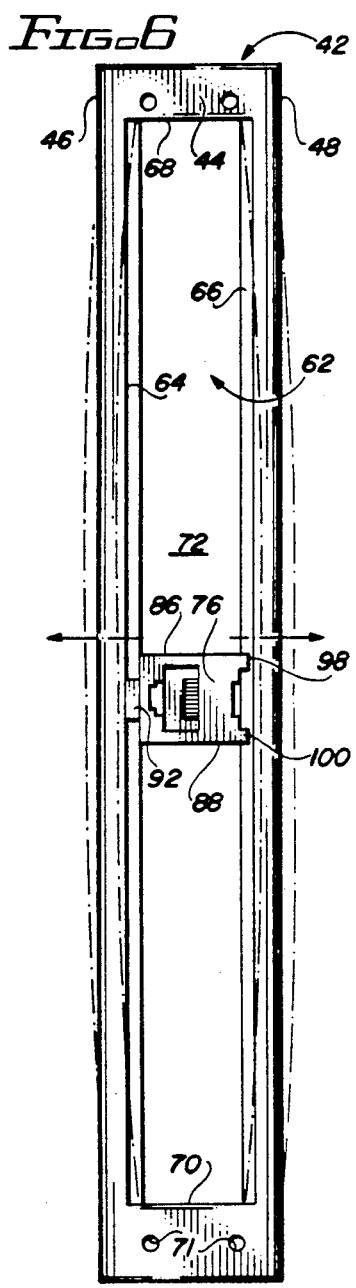
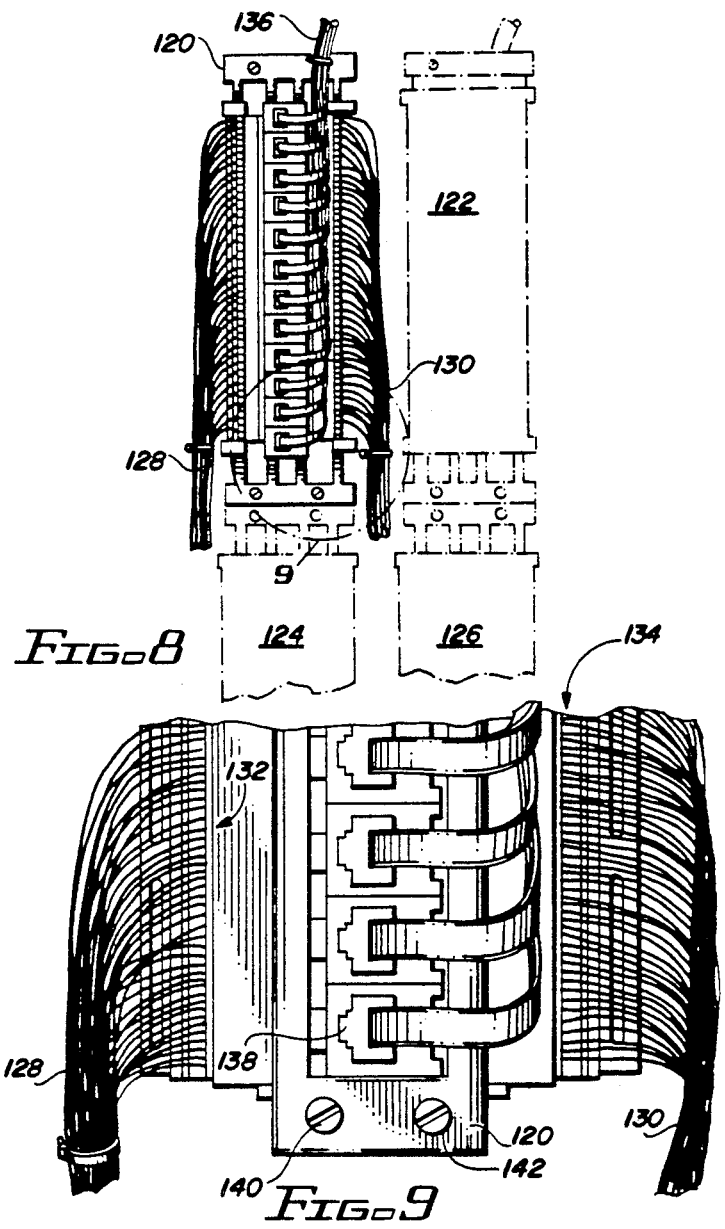
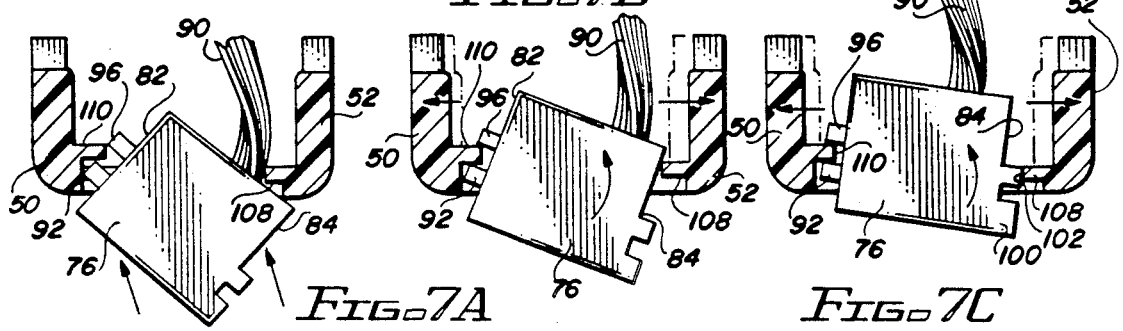

MULTIPLE TELEPHONE JACK SLIDE ASSEMBLY HAVING RESILIENT CLOSED CHANNEL

BACKGROUND OF THE INVENTION

1. Field of The Invention

The present invention relates generally to telecommunications wiring interchange equipment, and more particularly, to apparatus adapted to support a plurality of telephone jacks upon a telephone wiring interconnection system.

2. Description of the Prior Art

Within business, offices, apartment complexes and other locations where a number of telephone lines and-/or data telecommunication lines are clustered together, telephone service is typically provided via a central telephone interchange wiring panel installed at the site of the business, office, apartment complex, etc.. Often, an underground or overhead trunk cable is routed to the wiring panel, and the interconnection between the trunk cable and the individual telephone and/or data communication lines is made upon the wiring panel. Individual telephone line wires and/or data communication line wires are routed from the wiring panel to each telephone or data terminal in use at the site.

Presently, wiring interconnections are typically made upon the telephone interchange wiring panel through the use of so-called terminal blocks or connecting blocks. One such terminal block in common use is that commercially available from American Telephone and Telegraph Company (AT&T) as Part Number 110AW1-100. Such terminal blocks provide multiple rows of wire-gripping terminals housed in a fire-retardant plastic base unit, the wire-gripping terminals being adapted to releasably grasp and retain the ends of telephone wires.

Wires from the telephone company trunk line are connected to terminals of the aforementioned terminal block. Wires leading to telephones and data terminals within the business, office, apartment complex, etc., are also coupled to the terminal block. To facilitate wiring changes, it is now known to mount jacks to such terminal blocks, and to couple on-site telephones and data terminals to the trunk lines through such telephone jacks. Wiring leading to on-site telephones or data terminals terminates in a telephone plug adapted to mate with one of the telephone jacks supported upon the terminal block. Telephone and/or data communications can then be established, disconnected, or rerouted simply by inserting, removing, or repositioning the corresponding telephone plug from or within one of the telephone jacks supported by the terminal block.

A number of different telephone jacks support devices are already known, including those described within U.S. Pat. Nos. 4,658,418 and 4,712,232. These two patents disclose a multiple telephone jack slide assembly including a jack support member for supporting a plurality of telephone jacks. The jack support member has a longitudinal channel formed by a slotted opening for slidingly receiving the plurality of telephone jacks. A retaining member may be secured to the jack support after the telephone jacks are inserted therein to inhibit further sliding movement of the telephone jacks.

Also, U.S. Pat. No. 4,773,867, issued to Keller et al., discloses a printed circuit board subassembly including modular telephone jacks as circuit interconnection devices to selectively join communications equipment throughout a building to incoming communications circuits.

In addition, AT&T presently markets a 110-type terminal block which includes twelve modular pre-wired telephone jacks mounted in a metal slide-type support bracket under Part No. 110AB1-100JP12.

As the use of telephone jacks in conjunction with terminal blocks becomes more widely accepted and practiced, the cost of producing telephone jack slide assemblies becomes more critical. One of the disadvantages with many of the telephone jack support assemblies already known is that they are made of metal and have a relatively high material cost and production labor cost.

Yet another disadvantage of many of the telephone jack support devices already known is the difficulty of inserting the plurality of telephone jacks within the telephone jack support device. Some of those telephone jacks support devices that are commercially available include enlarged openings at one of the ends of the support channel through which each of the individual telephone jacks must be passed in order to gain access to the channel. Still other telephone jack support devices which are commercially available include retaining bumps or nubs which serve to maintain the telephone jacks in the desired position after they are slid into the channel; when inserting each of the telephone jacks into the channel, the assembler must advance the telephone jacks over the retainer bumps in order to fill the channel with the telephone jacks.

Telephone jack support devices that are typically available include a channel which is of greater length than the cumulative length of the telephone jack supported thereby. Accordingly, the telephone jacks inserted within such channel can slide out of the desired position until either a retaining device is installed, or until the telephone jacks support device is snapped onto the 110 terminal block. Further, many of the telephone jack support devices now in use require that the telephone jacks be inserted from one end of the channel. For those telephone jacks which need to be positioned at the opposite end of the channel, the assembly person must spend time sliding such telephone jacks the full length of the channel, thereby lengthening the assembly time.

While it is generally known to use plastic materials in place of metals to reduce component costs, many plastic materials flex easily. If a telephone jack support device flexes too easily, then the jack support slot formed therein can become too wide and permit the telephone jacks supported thereby to fall out.

Accordingly, it is an object of the present invention to provide a telephone jack support device which slidingly supports a plurality of telephone jacks for connection to a terminal block, which device may be manufactured from inexpensive materials and with minimal labor costs.

It is another object of the present invention to provide such a telephone jack support device wherein the telephone jacks may be easily and quickly inserted within the channel of the device.

It is still another object of the present invention to provide such a telephone jack support device wherein the telephone jacks may be inserted through the central portion of the channel, rather than from one end of the channel.

A further object of the present invention is to provide such a telephone jack support device adapted to support the plurality of telephone jacks in proper position without requiring any retainers or fasteners, and without requiring that the telephone jack support device first be snapped onto a 110 terminal block.

A still further object of the present invention is to provide such a telephone jack support device which is inexpensive, yet which is rigid enough to prevent the telephone jacks supported therein from falling out inadvertently, as when the support device is dropped.

Another object of the present invention is to provide such a telephone jack support device which is flame-retardant to inhibit electrical fires, and which is electrically non-conductive.

These and other objects of the present invention will become more apparent to those skilled in the art as the description thereof proceeds.

SUMMARY OF THE INVENTION

Briefly described, and in accordance with a preferred embodiment, the present invention relates to a multiple telephone jack slide assembly for supporting a plurality of telephone jacks to be electrically interconnected with a wiring system and including a sliding jack support member having an elongated jack receiving face with opposing longitudinal sides. A pair of opposing support flanges depend from the longitudinal sides of the jack receiving face substantially perpendicular thereto and adapted to secure the sliding jack support member to a terminal block. The jack receiving face of the support member includes a generally rectangular slot providing a channel defined by first and second opposing edge portions and first and second closed ends.

A plurality of telephone jacks to be supported by the sliding jack support member each has an upper surface opening into a cavity for releasably receiving a mating telephone cord plug. Each of the telephone jacks includes a pair of opposing side walls perpendicular to the upper surface and separated by a side wall separation distance approximating the width of the channel. The side walls of each telephone jack slidingly engage the opposing edge portions of the channel to slidingly support the telephone jacks therein. In addition, each of the telephone jacks includes a pair of opposing end walls perpendicular to the aforementioned side walls, the opposing end walls being separated by a predetermined jack length.

The length of the channel between the closed ends thereof is substantially equal to an integral multiple N of the predetermined jack length for permitting the channel to support N telephone jacks therein, with the end walls of the telephone jacks in abutting end-to-end relationship with each other and with the ends of the channel.

The jack support member has sufficient resilience to permit the opposing edge portions thereof to be temporarily forced apart from each other near the central portion of the channel by a distance greater than the side wall separation distance. Each of the plurality of the telephone jacks may thereby be inserted within the central portion of the channel and slidingly advanced to a desired position. The jack support member is preferably made of a rigid, flame-retardant plastic such as polycarbonate.

The side walls of the telephone jacks may have grooves formed therein for engaging the opposing edge portions of the jack support member. Alternatively, the side walls of the telephone jacks may include cooperating projecting members spaced apart from one another by a gap, the gap serving as an engagement path for engaging the opposing edge portions of the jack support member. The grooves or, alternatively, the engagement paths defined by the aforementioned projections, may be offset from one another relative to the upper surface of the telephone jack, in which case, the opposing edge portions of the jack receiving face are also laterally offset from one another by a commensurate distance.

To simplify production of the telephone jack support device, at least one of the aforementioned opposing edge portions is formed by a reduced thickness portion of the jack receiving face. The second of such opposing edge portions may be formed as an elongated flange extending parallel to and offset from such reduced thickness portion of the jack receiving face.

BRIEF DESCRIPTION OF THE DRAWINGS

FIG. 1 is a perspective view of a 110-type terminal block equipped with a multiple telephone jack slide assembly constructed in accordance with the teachings of the present invention.

FIG. 2 is a perspective view of the multiple telephone jack slide assembly and illustrating the manner in which telephone jacks are inserted within the channel thereof.

FIG. 3 is a cross-sectional view of the sliding jack support member shown in FIG. 2 taken through the plane designated by lines 3—3 in FIG. 2.

FIG. 4 is a cross-sectional drawing of the sliding jack support member and a telephone jack supported thereby taken through the plane designated by lines 4—4 in FIG. 2.

FIG. 5 is a cross-sectional view of an end portion of the sliding jack support member shown in FIG. 2 and taken through the plane designated by lines 5—5 in FIG. 2.

FIG. 6 is a top view of the sliding jack support member shown in FIG. 2 and illustrating the temporary deformation of the channel to insert a telephone jack therein.

FIGS. 7a, 7b, and 7c are sequential cross-sectional views taken through the plane designated within FIG. 6 by lines 7—7 and illustrating the manner by which a telephone jack is inserted within the channel of the sliding jack support member.

FIG. 8 is a partial top view of a wiring interconnection panel including a number of terminal blocks, each provided with a multiple telephone jack slide assembly constructed in accordance with the teachings of the present invention.

FIG. 9 is an enlarged view of the portion of FIG. 8 enclosed by dashed circle 9.

DETAILED DESCRIPTION OF THE PREFERRED EMBODIMENTS

With reference to FIG. 1, a multiple telephone jack slide assembly, designated generally by reference numeral 20, is shown mounted to a terminal block 22. Terminal block 22 is of the type commercially available from American Telephone & Telegraph (AT&T) under part number 110 AW1-100 and will be referenced hereinafter as a 110-type terminal block. Terminal block 22 is provided with fastening holes, such as 24 and 26 within base portion 28, to receive screws for fastening terminal block 22 to a wiring interchange panel or the like. Terminal block 22 may also include two opposing banks of punch-down electrical terminals 30 and 32 adapted to be interconnected with incoming wires from a telephone system or data communication network, as will be described below in conjunction with FIGS. 8 and 9. Terminal block 22 also includes four tabs or ears, such as those shown in FIG. 1 as 34 and 36 which may be used to retain multiple telephone jack slide assembly 20 thereto. As indicated within FIG. 1, jack slide assembly 20 preferably includes twelve modular telephone jacks arranged in abutting end-to-end relationship from jack 38 to jack 40. While not shown in FIG. 1, color-coded connecting wires (see 90 in FIG. 4) extending from each of the telephone jacks 38-40 are each electrically connected to one of the punch-down terminals within bank 30 or bank 32 to facilitate interconnection with one of the incoming telephone wires.

Referring to FIGS. 2 and 6, multiple telephone jack slide assembly 20 includes a sliding jack support member 42 having a generally planar elongated jack receiving face 44 extending between a pair of opposing longitudinal sides 46 and 48. A pair of opposing support flanges 50 and 52 depend from sides 46 and 48, respectively, of jack receiving face 44 and extend substantially perpendicular thereto. Accordingly, jack receiving face and support flanges 50 and 52 together form a generally U-shaped member in lateral cross-section, as shown in FIGS. 3, 4 and 5. Support flanges 50 and 52 serve as standoffs to space the plurality of telephone jacks 38-40 (see FIG. 1) a sufficient distance above terminal block 22 to avoid interference therebetween. In addition, the ends of support flanges 50 and 52 preferably have square apertures formed therein, as indicated by reference numerals 54, 56, 58, and 60 in FIG. 2, adapted to releasably engage the aforementioned ears 34 and 36 extending from terminal block 22. Thus, support flanges 50 and 52, and apertures 54-60, constitute a means for fastening jack support member 42 to terminal block 22.

As shown in FIGS. 2 and 6, jack receiving face 44 has a generally rectangular slot formed therein to provide an elongated channel 62 in jack support member 42. Channel 62 is bounded by and defined by opposing edge portions 64 and 66 of jack receiving face 44 and by first and second closed ends 68 and 70. The width of channel 62 corresponds to the predetermined distance separating opposing edge portions 64 and 66 of jack receiving face 44. The length of channel 62 corresponds to the predetermined distance separating closed ends 68 and 70 of channel 62. The channel includes a central portion 72 (see FIG. 6) disposed substantially midway between ends 68 and 70 of channel 62.

Preferably, jack support member 42 is molded from a substantially rigid, flame-retardant plastic, such as a polycarbonate. The preferred material is "LEXAN" brand polycarbonate plastic material available from General Electric Company. Such material is moldable, fire-retardant, extra strong, electrically non-conductive, and has excellent memory characteristics. Such polycarbonate material is sufficiently resilient to allow an assemblyperson to spread edge portions 64 and 66 of jack receiving face 44 apart while immediately thereafter snapping back to their original position. Such material is sufficiently strong to maintain channel 62 of continuous width when not being forced apart by an assemblyperson.

As described above, telephone jack slide assembly 20 includes a plurality of telephone jacks, two of which are indicated in FIG. 2 by reference numeral 76. As shown in FIG. 2, each such telephone jack 76 has an upper surface 78 opening into a cavity 80 for releasably receiving a mating telephone cord plug (see 138 in FIG. 9). Each telephone jack 76 includes a pair of opposing side walls 82 and 84 extending downwardly from upper surface 78 substantially perpendicular thereto, as indicated in FIG. 4. Opposing side walls 82 and 4 are separated from each other by a side wall separation distance approximating the width of channel 62. Each telephone jack 76 further includes a pair of opposing end walls 86 and 88 oriented substantially perpendicular to side walls 82 and 84 and substantially perpendicular to upper surface 78 of telephone jack 76. End walls 86 and 88 are separated from each other by a predetermined jack length. Color-coded connecting wires 90, shown in FIGS. 2 and 4, extend from the bottom portion of each telephone jack 76 for making electrical interconnections with the contacts housed within cavity 80.

A variety of telephone jacks of the general type described above are commercially available and may be used in practicing the present invention. For example, telephone jacks are available from American Telephone & Telegraph (AT&T), formerly Western Electric, under part numbers WE 652A and WE 652D, wherein side grooves are provided within the opposing side walls of such telephone jacks, such side grooves being equally spaced from the upper surface of such telephone jacks. In such instance, the channel width is made to be slightly less than the width of such telephone jacks, i.e., the side wall separation distance separating the side walls of such telephone jacks is slightly in excess of the width of the channel. In such embodiment, the opposing edge portions 64 and 66 of the channel are co-planar and are of a thickness commensurate with the width of the grooves formed within the sidewalls of the telephone jacks; the grooves of such jacks are then adapted to slidingly receive the opposing edge portions of the jack receiving face for supporting each of the telephone jacks in sliding engagement with the jack support member.

Another variety of modular telephone jacks that is commonly used is the general type illustrated in FIGS. 2, 4, and 7 of the drawings, and commercially available from AT&T under part numbers WE 641C and WE 647B. This variety of modular telephone jack includes side walls having a series of projections which help to support the jack. For example, in FIG. 2, side wall 82 of jack 76 includes first upper projection 92 and second and third lower projections 94 and 96, respectively, extending from side wall 82. As shown projection 92 is spaced below upper surface 78. As further shown in FIGS. 2 and 4, lower projections 94 and 96 are aligned with each other an equal distance from upper surface 78 and are spaced apart from upper surface 78 by a greater distance than is the case for projection 92. Upper projection 92 and lower projections 94 and 96 are spaced a sufficient distance apart from each other, relative to upper surface 78, to create a predetermined gap therebetween; this predetermined gap between upper projection 92 and lower projections 94 and 96 defines a first engagement path within side wall 82. A second engagement path is formed within side wall 84. A pair of projections 98 and 100 extend from side wall 84 adjacent upper surface 78. A lower projection 102 (see FIG. 4) extends from side wall 84 spaced apart from projections 98 and 100 by a sufficient distance, relative to upper surface 78, to create the predetermined gap therebetween; this predetermined gap between projections 98 and 100, and 102, defines the aforementioned second engagement path. As shown in FIG. 4, the first engagement path and the second engagement path are offset from one another relative to upper surface 78, i.e., the first engagement path lies a first distance from upper surface 78, and the second engagement path lies a second distance from upper surface 78, such first and second distances differing from each other by a predetermined offset.

As set forth above, jack support member 42 includes a jack receiving face 44 having channel 62 formed therein between opposing edge portions 64 and 66. Referring to FIG. 3, jack receiving face includes an upper surface 104 and an underlying surface 106 separated from each other by the predetermined thickness of jack receiving face 44. Edge portion 66 of channel 62 is preferably formed as a reduced thickness portion 108 of jack receiving face 44 adjacent lower surface 106 of jack receiving face 44 but inset, or countersunk, from upper surface 104. The thickness of reduced thickness portion 108 of jack receiving face 44 is commensurate with the aforementioned predetermined gap between upper projections 98 and 100 and lower projection 102 for allowing reduced thickness portion 108 to be slidingly received within the aforementioned second engagement path, as shown in FIG. 4.

Still referring to FIGS. 3 and 4, edge portion 64 of channel 62 preferably includes an elongated flange 110 extending parallel to but offset from reduced thickness portion 108 of edge portion 66. Flange 110 may actually extend below the lower surface 106 of jack receiving face 44. Flange 110 is laterally offset from reduced thickness portion 108 by the same predetermined offset by which the aforementioned first and second engagement paths are offset from each other. The thickness of flange 110 is preferably the same as that of reduced thickness portion 108, and also the same as the predetermined gap separating upper projection 92 of side wall 82 from lower projections 94 and 96 thereof for allowing flange 110 to be slidingly received within the aforementioned first engagement path, as shown in FIG. 4.

In summary, upper projection 92 and lower projections 94 and 96 of side wall 82 collectively provide a first engagement means for allowing first side wall 82 to slidingly engage edge portion 64 of channel 62, while upper projections 98 and 100 and lower projection 102 of side wall 84 collectively provide a second engagement means for allowing second side wall 84 to slidingly engage edge portion 66 of channel 62, thereby slidingly supporting each telephone jack 76 within channel 62.

Because channel 62 is closed at both of its ends 68 and 70, the plurality of telephone jacks may not be inserted into channel 62 from one of its ends. Instead, jack support member 42 is molded from a material that is sufficiently resilient to permit opposing edge portions 64 and 66 of channel 62 to be temporarily pulled apart from each other near central portion 72 thereof by a distance exceeding the side wall separation distance of telephone jack 76 without permanently deforming jack support member 42. Within FIG. 6, the dashed lines indicate the manner by which the edge portions 64 and 66 of channel are temporarily pulled apart near the central portion 72 of the channel. When central portion 72 of channel 62 is widened in this manner, the telephone jack 76 may easily be inserted into central portion 72 of the channel.

FIGS. 7A, 7B, and 7C demonstrate the manner by which each telephone jack 76 may be inserted within channel 62. In FIG. 7A, lower projections 94 and 96 of side wall 82 are engaged around and under flange 110, while upper projection 92 is engaged above flange 110. Referring to FIG. 7B, opposing support flanges 50 and 52 of jack support member 42 are then pulled apart from each other to expand the width of channel 62 near the central portion 72 thereof; at the same time, jack 76 is rotated into channel 62 past reduced thickness portion 108. As shown in FIG. 7C, the assembly person continues to temporarily force apart support flanges 50 and 52 until lower projection 102 of side wall 84 just clears and passes beyond reduced thickness portion 108 of edge portion 66. The assembly person may then release support flanges 50 and 52, allowing channel 62 to return to its original position as shown in FIG. 4, and as shown by the solid lines in FIG. 6. Telephone jack 76 may then be slid along channel 62 toward either end 68 or end 70. This insertion process may be repeated until all twelve telephone jacks are supported within channel 62, as shown in FIG. 1.

It will be recalled that one aspect of the present invention relates to the elimination of any need for retainers or fasteners to hold the twelve telephone jacks in proper position before or after installing the jack support member upon a terminal block. In this regard, the length of channel 62 is selected to be substantially equal to an integral multiple N of the aforementioned predetermined jack length, as measured from end wall 86 to end wall 88, for permitting N number of telephone jacks to be supported within channel 62. Preferably, N is selected to be the integer 12, whereby twelve modular phone jacks are supported within channel 62, as shown in FIG. 1. As shown in FIG. 1, by making the channel length substantially equal to twelve times the predetermined jack length, one of the end walls of jack 40 abuts end 68 of channel 62, one of the end walls of jack 38 abuts end 70 of channel 62, and the intermediate jacks are disposed with their end walls in abutting end-to-end relationship, thereby locking the twelve phone jacks in their desired final position.

As shown in FIG. 8, a number of terminal blocks, including those shown as 120, 122, 124, and 126 may be secured to a telephone interchange panel for interconnecting incoming communication lines with telephones or data terminals at the local site. As indicated in FIGS. 8 and 9, the incoming communication lines are routed as bundles 128 and 130 and are interconnected with selected punch down terminals 132 and 134 of terminal block 120 or terminal blocks 122-126. Wiring originating from on-site telephones and/or data terminals is gathered and fed as a bundle 136 to the interchange panel, as shown in FIG. 8. Groups of wires connected to a particular telephone or data terminal are collectively connected to a specific telephone plug, like that designated 138 in FIG. 9. As indicated by FIGS. 8 and 9, the grouping of wires coupled to telephone plug 138 forms one of the groupings of wires within bundle 136. As further reflected in FIG. 9, fastening screws 140 and 142 may, if desired, be inserted through fastening holes 71 (see FIGS. 1 and 2) to more permanently secure jack support member 42 to terminal block 22.

Those skilled in the art will now appreciate that a multiple telephone jack slide assembly has been described for supporting a plurality of telephone jacks to be electrically interconnected with a wiring system and wherein the sliding jack support member may be produced as a molded plastic product from inexpensive materials and with minimal labor costs. It will also be appreciated that the telephone jack slide assembly described above facilitates insertion of the telephone jacks within the supporting channel in a simple manner and automatically retains the telephone jacks in the desired position after such telephone jacks have been inserted within the supporting channel. While the present invention has been described with reference to a preferred embodiment thereof, the description is for illustrative purposes only and is not to be construed as limiting the scope of the invention. Various other modifications and changes may be made by those skilled in the art without departing from the true spirit and scope of the invention as defined by the appended claims.

We claim:

1. A multiple telephone jack slide assembly for supporting a plurality of telephone jacks to be electrically interconnected with a wiring system, said assembly including:

(a) a sliding jack support member having a first generally planar elongated jack receiving face, said jack receiving face having a pair of opposing longitudinal sides, said sliding jack support member further including at least two opposing support flanges depending from said opposing longitudinal sides of said jack receiving face substantially perpendicular thereto, said jack receiving face having a generally rectangular slot formed therein to provide a channel, said channel being defined by first and second generally opposing edge portions of said jack receiving face, said first and second generally opposing edge portions being separated by a predetermined distance generally corresponding to the width of said channel, and said channel having first and second closed ends separated by a predetermined channel length, said first and second closed ends being one-piece with said first and second generally opposing edge portions of said jack receiving face, said channel having a central portion substantially midway between said first and second closed ends thereof;

(b) a plurality of telephone jacks each having an upper surface opening into a cavity for releasably receiving a mating telephone cord plug, each of said telephone jacks further including a pair of opposing side walls extending downwardly from said upper surface and substantially perpendicular thereto, said opposing side walls being separated by a side wall separation distance approximating the width of said channel, said opposing side walls including engaging means for slidingly engaging said first and second generally opposing edge portions of said channel in order to slidingly support said plurality of telephone jacks within said channel, each of said telephone jacks having a pair of opposing end walls substantially perpendicular to said side walls and substantially perpendicular to said upper surface, said end walls being separated by a predetermined jack length;

(c) said predetermined channel length being substantially an integral multiple N of said predetermined jack length for permitting said channel to support N telephone jacks therein with the end walls of said N telephone jacks in abutting end-to-end relationship with each other and with the first and second ends of said channel; and (d) said jack support member having sufficient resilience to permit the opposing edge portions thereof to be temporarily forced apart from each other near the central portion of said channel by a distance exceeding the side wall separation distance without permanently deforming said jack support member for allowing each of said N telephone jacks to be inserted within said channel through the central portion thereof.

2. The assembly recited by claim 1 wherein said engaging means of said plurality of telephone jacks comprises first and second grooves formed within the opposing side walls, respectively, of each of said telephone jacks, the side wall separation distance separating said opposing side walls being slightly in excess of the width of said channel, said first and second grooves being adapted to slidingly receive said first and second generally opposing edge portions of said jack receiving face, respectively, for supporting each of said telephone jacks in sliding engagement with said support member.

3. The assembly recited by claim 1 wherein:

(a) said engaging means included within said opposing side walls of each of said plurality of telephone jacks comprises a first engagement means disposed upon a first of said opposing side walls and a second engagement means disposed upon a second of said opposing side walls, said first engagement means defining a first engagement path lying a first distance from the upper surface of each said telephone jack, said second engagement means defining a second engagement path lying a second distance from the upper surface of each said telephone jack, and wherein the second distance differs from the first distance by a predetermined offset; and (b) said first and second generally opposing edge portions of said jack receiving face being laterally offset from one another by said predetermined offset for permitting said first edge portion to be slidingly received within the first engagement path and for permitting said second edge portion to be slidingly received within the second engagement path.

4. The assembly recited by claim 1 wherein:

(a) said engaging means included within said opposing side walls of each of said plurality of telephone jacks comprises at least first and second projections extending from each of said opposing side walls, said at least first and second projections being spaced apart from one another by a predetermined gap to define an engagement path within each of said opposing side walls; and (b) said first and second generally opposing edge portions of said jack receiving face each having a thickness commensurate with said predetermined gap for allowing each of said first and second generally opposing edge portions of said jack receiving face to be slidingly received between said at least first and second projections extending from each of said opposing side walls.

5. The assembly recited by claim 1 wherein said support member includes means for fastening said support member to a terminal block.

6. The assembly recited by claim 3 wherein said jack receiving face has a predetermined thickness, the first of said generally opposing edge portions comprising a reduced thickness portion of said jack receiving face, the second of said generally opposing edge portions comprising an elongated flange extending parallel to and offset from said reduced thickness portion of said jack receiving face.

7. The assembly recited by claim 1 wherein said jack support member is made of polycarbonate.

8. A multiple telephone jack slide assembly for supporting a plurality of telephone jacks to be electrically interconnected with a wiring system, each of the plurality of telephone jacks having an upper surface opening into a cavity for releasably receiving a mating telephone cord plug, each of the telephone jacks further including a pair of opposing side walls extending downwardly from the upper surface thereof and substantially perpendicular thereto, the opposing side walls being separated by a side wall separation distance corresponding to the width of the telephone jack, the opposing side walls including engagements adapted to aid in supporting each telephone jack, each of said telephone jacks having a pair of opposing end walls substantially perpendicular to the side walls thereof and substantially perpendicular to the upper surface thereof, the opposing end walls being separated by a predetermined jack length, said slide assembly comprising in combination:

(a) a sliding jack support member having a first generally planar elongated jack receiving face, said jack receiving face having a pair of opposing longitudinal sides, said sliding jack support member further including at least two opposing support flanges depending from said opposing longitudinal sides of said jack receiving face substantially perpendicular thereto, said jack receiving face having a generally rectangular slot formed therein to provide a channel, said channel being defined by first and second generally opposing edge portions of said jack receiving face, said first and second generally opposing edge portions being separated by a predetermined distance generally corresponding to the width of said channel and commensurate with the width of said telephone jacks, said channel having first and second closed ends separated by a predetermined channel length, said first and second closed ends being one-piece with said first and second generally opposing edge portions of said jack receiving face, said channel having a central portion substantially midway between the first and second closed ends thereof, said first and second generally opposing edge portions being adapted to be slidingly engaged by the engagements included within the opposing side walls of each telephone jack to slidingly support each of the plurality of telephone jacks within said channel;

(b) said predetermined channel length being substantially an integral multiple N of the predetermined jack length for permitting said channel to support N telephone jacks therein with the end walls of the N telephone jacks in abutting end-to-end relationship with each other and with the first and second ends of said channel; and (c) said jack support member having sufficient resilience to permit the opposing edge portions thereof to be temporarily forced apart from each other near the central portion of the channel by a distance exceeding the side wall separation distance without permanently deforming said jack support member for allowing each of the N telephone jacks to be inserted within said channel through the central portion thereof.

9. The assembly recited by claim 8 wherein each of the plurality of telephone jacks has first and second projections extending from each of its side walls, the first and second projections being spaced apart from one another by a predetermined gap to define an engagement path within each of the opposing side walls, and wherein said first and second generally opposing edge portions of said jack receiving face each have a thickness commensurate with the predetermined gap for allowing each of said first and second generally posing edge portions of said jack receiving fact to be slidingly received between the first and second projections extending from each of the side walls of the telephone jacks.

10. The assembly recited by claim 8 wherein said support member includes means for fastening said support member to a terminal block.

11. The assembly recited by claim 8 wherein said jack receiving face has a predetermined thickness, the first of said generally opposing edge portions comprising a reduced thickness portion of said jack receiving face, the second of said generally opposing edge portions comprising an elongated flange extending parallel to and offset from said reduced thickness portion of said jack receiving face.

12. The assembly recited by claim 8 wherein said jack support member is made of polycarbonate.

* * * * *